United States Patent
Matsuda et al.

(10) Patent No.: US 9,869,572 B2
(45) Date of Patent: Jan. 16, 2018

(54) SEMICONDUCTOR ACOUSTIC MEASUREMENT DEVICE THAT DETERMINES THE PRESENCE OR ABSENCE OF THE SECOND ULTRASONIC MEASUREMENT

(71) Applicant: Kabushiki Kaisha Toshiba, Minato-Ku, Tokyo (JP)

(72) Inventors: Masanori Matsuda, Edogawa Tokyo (JP); Junichi Takeda, Yokohama Kanagawa (JP); Masakazu Yaginuma, Yokosuka Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/065,477

(22) Filed: Mar. 9, 2016

(65) Prior Publication Data

US 2017/0067767 A1 Mar. 9, 2017

Related U.S. Application Data

(60) Provisional application No. 62/215,610, filed on Sep. 8, 2015.

(51) Int. Cl.
G01F 1/66 (2006.01)

(52) U.S. Cl.
CPC .................... G01F 1/667 (2013.01)

(58) Field of Classification Search
None
See application file for complete search history.

(56) References Cited

U.S. PATENT DOCUMENTS

| 4,003,256 A * | 1/1977 | Donelan ................. G01P 5/247 73/861.27 |
| 2003/0009300 A1* | 1/2003 | Giurgiutiu ............. G01N 29/11 702/35 |
| 2010/0011880 A1* | 1/2010 | Keilman .................. G01F 1/66 73/861.28 |
| 2011/0238332 A1* | 9/2011 | Shiba ...................... G01F 1/667 702/48 |

(Continued)

FOREIGN PATENT DOCUMENTS

| JP | 2001-255184 A | 9/2001 |
| JP | 2004-163251 A | 6/2004 |
| JP | 2010-286250 A | 12/2010 |

*Primary Examiner* — Harshad R Patel
(74) *Attorney, Agent, or Firm* — White & Case LLP (57) ABSTRACT

A semiconductor device according to the present embodiment is provided with a controller, a first detector, a second detector, and a determiner. In a first measurement, the first detector detects a first measured value correlated with the propagation time of the first acoustic wave in a first detection period from the transmission to the reception of the first acoustic wave. In a second measurement, the second detector detects a second measured value correlated with the propagation time of the second acoustic wave in a second detection period from the transmission to the reception of the second acoustic wave. The determiner determines the presence or absence of the second measurement on the basis of the result of comparison between the first measured value and another first measured value measured earlier than the first measured value.

19 Claims, 2 Drawing Sheets

(56) References Cited

U.S. PATENT DOCUMENTS

| | | | | |
|---|---|---|---|---|
| 2011/0246098 A1* | 10/2011 | Takemura | ............... | G01F 1/667 |
| | | | | 702/48 |
| 2012/0185183 A1* | 7/2012 | Takemura | ................. | G01F 1/66 |
| | | | | 702/48 |
| 2013/0269447 A1* | 10/2013 | Takemura | ................. | G01F 1/66 |
| | | | | 73/861.27 |
| 2015/0292926 A1* | 10/2015 | Takemura | ................. | G01F 1/66 |
| | | | | 73/861.03 |

* cited by examiner

SEMICONDUCTOR ACOUSTIC MEASUREMENT DEVICE THAT DETERMINES THE PRESENCE OR ABSENCE OF THE SECOND ULTRASONIC MEASUREMENT

CROSS-REFERENCE TO RELATED APPLICATIONS

This application is based upon and claims the benefit of priority from the prior U.S. Provisional Patent Application No. 62/215,610 filed on Sep. 8, 2015, the entire contents of which are incorporated herein by reference.

FIELD

The present embodiment relates to a semiconductor device, a measurement device, and a measurement method.

BACKGROUND

As a technique to measure the flow rate of a fluid in a flow path, there has been known a technique to measure the propagation time of an ultrasonic wave in the downstream direction of the flow path and the propagation time of the ultrasonic wave in the upstream direction of the flow path to calculate a flow rate on the basis of the difference between these two propagation times. In this technique, flow rates can be precisely measured using the difference in propagation time even if the propagation velocity of the ultrasonic wave varies due to temperature change or the like.

Incidentally, flow rates are required to be frequently measured in such applications as water meters where a fluid flow rate dynamically changes, in order to accurately know the dynamically-changing flow rate. If flow rates are frequently measured, there is concern over an increase in the power consumption of a measurement device.

DETAILED DESCRIPTION

A semiconductor device according to the present embodiment is used to measure the flow velocity or flow rate of a fluid based on the difference between the propagation time of an acoustic wave to the downstream side of a fluid flow path and the propagation time of the acoustic wave to the upstream side of the fluid flow path. The semiconductor device is provided with a controller, a first detector, a second detector, and a determiner. The controller can control an upstream-side first transceiver and a downstream-side second transceiver which transmit/receive an acoustic wave to/from each other in the flow path. The controller controls first measurement including the transmission of a first acoustic wave in one of the first and second transceivers and the reception of the first acoustic wave in the other one of the first and second transceivers and second measurement including the transmission of a second acoustic wave in the other transceiver and the reception of the second acoustic wave in one transceiver. In the first measurement, the first detector detects a first measured value correlated with the propagation time of the first acoustic wave in a first detection period from the transmission to the reception of the first acoustic wave. In the second measurement, the second detector detects a second measured value correlated with the propagation time of the second acoustic wave in a second detection period from the transmission to the reception of the second acoustic wave. The determiner determines the presence or absence of the second measurement on the basis of the result of comparison between the first measured value and another first measured value measured earlier than the first measured value.

Embodiments will now be explained with reference to the accompanying drawings. The present invention is not limited to the embodiments.

Figure 1:
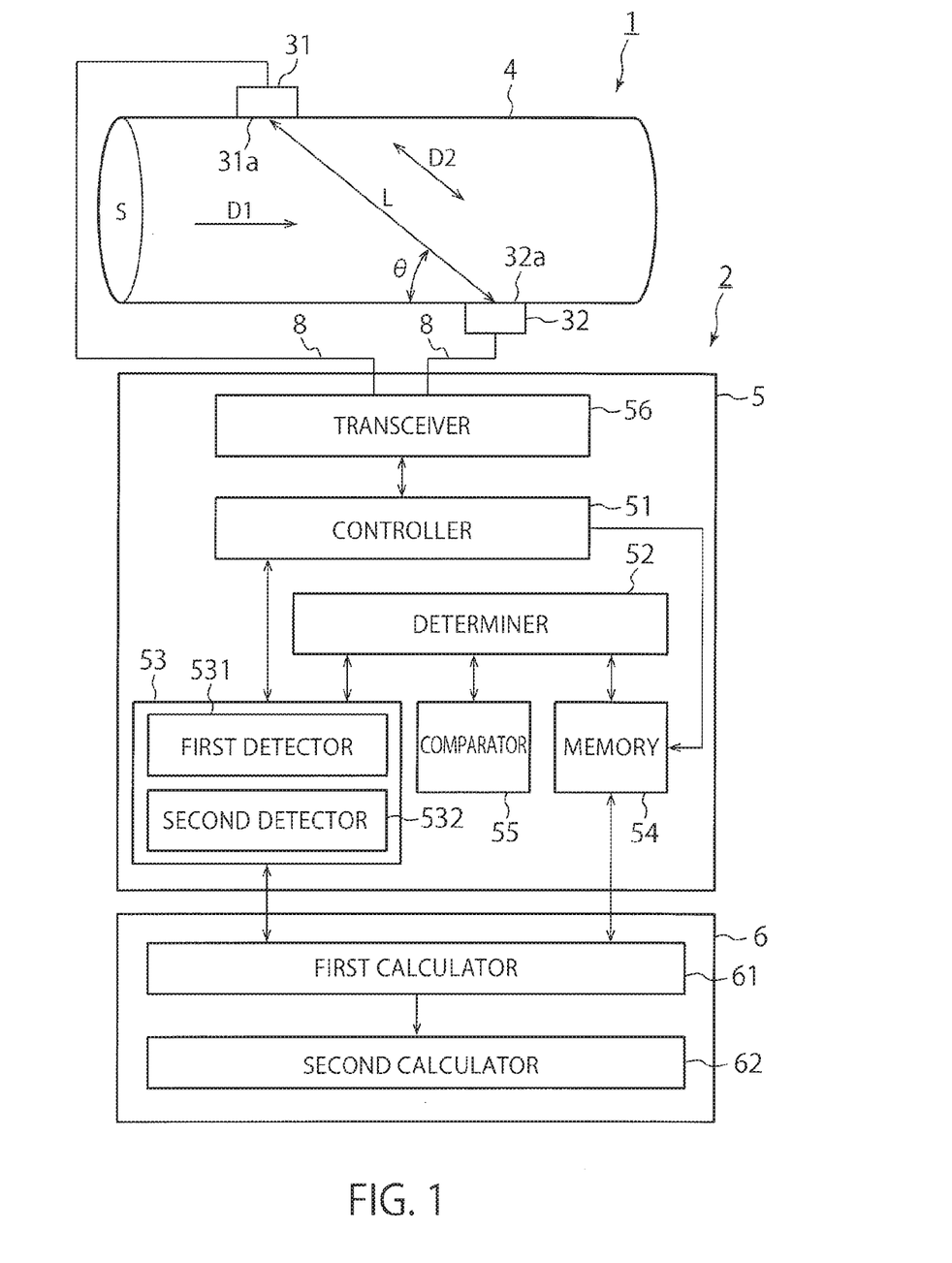
FIG. 1 is a block diagram of a flow rate-measuring system illustrating the present embodiment.

FIG. 1 is a block diagram of a flow rate-measuring system 1 illustrating the present embodiment. The flow rate-measuring system 1 of the present embodiment can be applied to, for example, water meters and the heat meters or gas meters of hydronic floor heating systems. The flow rate-measuring system 1 uses batteries as a power source.

As illustrated in FIG. 1, the flow rate-measuring system 1 is provided with a flow rate-measuring device 2, a first ultrasonic sensor 31 which is one example of the first transceiver, and a second ultrasonic sensor 32 which is one example of the second transceiver.

The flow rate-measuring device 2 measures a fluid flow rate on the basis of the difference between the propagation time of an ultrasonic wave to the downstream side in a fluid flow path 4 and the propagation time of the ultrasonic wave to the upstream side in the flow path 4. The ultrasonic wave is one example of an acoustic wave. The ultrasonic wave is an acoustic wave higher in oscillation frequency than acoustic waves in an audible range and having an oscillation frequency of, for example, 16 kHz to 20 kHz or higher.

As a specific configuration for measuring flow rates, the flow rate-measuring device 2 is provided with a semiconductor device 5 and a semiconductor device 6. Note that the semiconductor devices 5 and 6 may be composed of a single semiconductor device or a plurality of semiconductor devices, for example, three or more semiconductor devices.

The semiconductor device 5 is used to measure fluid flow rates in a state of being mounted on the flow rate-measuring device 2. As a specific configuration, the semiconductor device 5 is provided with a controller 51, a determiner 52, a counter 53, a memory 54, a comparator 55, and a transceiver 56.

The counter 53 is provided with a first detector 531 and a second detector 532. The transceiver 56 may be, for example, the analog front end of a semiconductor integrated circuit. The controller 51, the determiner 52, the counter 53 and the comparator 55 may be the logical units of the semiconductor integrated circuit. The memory 54 may be disposed in the semiconductor integrated circuit or externally to the semiconductor integrated circuit.

The semiconductor device 6 is provided with a first calculator 61 and a second calculator 62. The semiconductor device 6 is, for example, a processor.

(Ultrasonic Sensors 31 and 32)

The first ultrasonic sensor 31 and the second ultrasonic sensor 32 are disposed in the flow path 4, so as to expose sensor surfaces 31a and 32a of the sensors 31 and 32 to the interiors of the flow path 4. Specifically, the sensor surface 31a of the first ultrasonic sensor 31 faces the sensor surface 32a of the second ultrasonic sensor 32 on the upstream side of the second ultrasonic sensor 32 in a fluid flow direction D1. That is, the sensor surface 32a of the second ultrasonic sensor 32 faces the sensor surface 31a of the first ultrasonic sensor 31 on the downstream side of the first ultrasonic sensor 31 in the fluid flow direction D1. A direction D2 of a straight line connecting the sensor surface 31a of the first ultrasonic sensor 31 and the sensor surface 32a of the second ultrasonic sensor 32 is the propagation direction of an ultrasonic wave. In addition, a distance L between the sensor surface 31a of the first ultrasonic sensor 31 and the sensor surface 32a of the second ultrasonic sensor 32 is the propagation length of an ultrasonic wave. The propagation direction D2 of an ultrasonic wave is inclined at a predetermined angle θ with respect to the flow direction D1. Yet additionally, the first ultrasonic sensor 31 and the second ultrasonic sensor 32 are connected to the semiconductor device 5 using wires 8.

The first ultrasonic sensor 31 and the second ultrasonic sensor 32 transmit/receive an ultrasonic wave to/from each other in the flow path 4. Specific embodiments of the first ultrasonic sensor 31 and the second ultrasonic sensor 32 are not limited in particular but may be, for example, piezoceramics, which means that the ultrasonic wave may be transmitted/received utilizing the vibrations of the sensor surfaces 31a and 32a.

(Controller 51)

The controller 51 controls the first ultrasonic sensor 31 and the second ultrasonic sensor 32 through the transceiver 56.

Specifically, the controller 51 outputs a first driving signal to the first ultrasonic sensor 31 through the transceiver 56. The first driving signal causes the first ultrasonic sensor 31 to transmit a first ultrasonic wave to the second ultrasonic sensor 32 and the second ultrasonic sensor 32 to receive the first ultrasonic wave. Such a series of processes from the transmission and reception of the first ultrasonic wave to the detection of a first count value to be described later is defined as measurement based on the first ultrasonic wave. The measurement based on the first ultrasonic wave is one example of the first measurement.

The controller 51 acquires a received signal of the ultrasonic wave from the second ultrasonic sensor 32 through the transceiver 56. Here, the first ultrasonic wave is one example of the first acoustic wave. The received signal of the first ultrasonic wave is an electrical signal into which the second ultrasonic sensor 32 has converted the first ultrasonic wave.

In addition, the controller 51, after having caused the ultrasonic sensors 31 and 32 to transmit and receive the first ultrasonic wave, outputs a second driving signal to the second ultrasonic sensor 32 through the transceiver 56. The second driving signal causes the second ultrasonic sensor 32 to transmit a second ultrasonic wave to the first ultrasonic sensor 31 and the first ultrasonic sensor 31 to receive the second ultrasonic wave. Such a series of processes from the transmission and reception of the second ultrasonic wave to the detection of a second count value to be described later is defined as measurement based on the second ultrasonic wave. The measurement based on the second ultrasonic wave is one example of the second measurement.

The controller 51 acquires a received signal of the second ultrasonic wave from the first ultrasonic sensor 31 through the transceiver 56. Here, the second ultrasonic wave is one example of the second acoustic wave. The received signal of the second ultrasonic wave is an electrical signal into which the first ultrasonic sensor 31 has converted the second ultrasonic wave.

Note that the second ultrasonic sensor 32 may transmit the first ultrasonic wave and the first ultrasonic sensor 31 may receive the first ultrasonic wave. Likewise, the first ultrasonic sensor 31 may transmit the second ultrasonic wave and the second ultrasonic sensor 32 may receive the second ultrasonic wave.

(First Detector 531)

The first detector 531 detects a first count value given by counting clock pulses in a first detection period from the transmission of the first ultrasonic wave, i.e., the output of the first driving signal, to the reception of first ultrasonic wave, i.e., the acquisition of the received signal of the first ultrasonic wave. Note that clock pulses may be input from the semiconductor device 6 to the counter 53.

Here, the first count value is one example of the first measured value (parameter) correlated with the propagation time of the first ultrasonic wave. The propagation time of the first ultrasonic wave is the time required for the first ultrasonic wave to propagate through a fluid and reach the second ultrasonic sensor 32 after being transmitted by the first ultrasonic sensor 31. The first count value is a value detected in a period from the transmission to the reception of the first ultrasonic wave, and therefore, correlates with the propagation time of the first ultrasonic wave. That is, the first measured value is not limited to a count value but may be another parameter the propagation time of which is calculable.

(Memory 54)

A first count value (hereinafter also referred to as the first count value of this time) detected by the first detector 531 this time, i.e., in the latest first detection period is stored in the memory 54 by the controller 51. Note that the first count value of this time is a first count value of the past for first count values detected in the next and later first detection periods.

In addition, a second count value detected by the second detector 532 to be described later is stored in the memory 54 by the controller 51 while being associated with the first count value of this time detected immediately before the detection of the second count value.

(Determiner 52 and Comparator 55)

The comparator 55 compares the first count value of this time and a first count value of the past stored in the memory 54 when the first count value of this time is detected by the first detector 531. The first count value of the past may be, for example, a first count value of the last time detected in an immediately preceding first detection period.

The determiner 52 determines the presence or absence of detection of the second count value by the second detector 532 to be described later on the basis of the result of comparison in the comparator 55. Specifically, the determiner 52 determines that measurement based on the second ultrasonic wave is not performed if the difference between the first count value of this time and the first count value of the past is no larger than a threshold value. On the other hand, the determiner 52 determines that measurement based on the second ultrasonic wave is performed if the difference between the first count value of this time and the first count value of the past is larger than the threshold value.

Note that the determiner 52 may decide on the detection of the second count value by the second detector 532, without limitation to the result of comparison in the comparator 55, if the frequency of measurement by the first detector 531 reaches a predetermined frequency of measurement. In addition, the determiner 52 may decide on the detection of the second count value by the second detector 532 if a predetermined period of time elapses during measurement by the first detector 531. Yet additionally, these conditions may be combined. That is, the determiner 52 can decide on the detection of the second count value by the second detector 532 on the basis of each of the combinations of the result of comparison, the frequency, and the period of time. For example, the detection of the second count value is decided on before the lapse of the predetermined period of time, if the measurement of the second count value is decided on based on the result of comparison. On the other hand, the detection of the second count value is decided on after the lapse of a predetermined period of time even if a period in which the second count value need not be measured continues due to the result of comparison. Consequently, the second count value can be detected after the lapse of a predetermined period of time or a predetermined number of times, even if the first count value varies over a microscopic range of values. High-precision measurement is therefore possible, while reducing power consumption.

(Second Detector 532)

If the determiner 52 decides on performing measurement based on the second ultrasonic wave, the second detector 532 detects the second count value in the second detection period from the transmission of the second ultrasonic wave, i.e., the output of the second driving signal, to the reception of the second ultrasonic wave, i.e., the acquisition of the received signal of the second ultrasonic wave. On the other hand, if the determiner 52 decides on not performing measurement based on the second ultrasonic wave, the second detector 532 does not detect the second count value. The second count value is a value given by counting clock pulses in the second detection period.

Here, the second count value is one example of the second measured value correlated with the propagation time of the second ultrasonic wave. The propagation time of the second ultrasonic wave is the time required for the second ultrasonic wave to propagate through a fluid and reach the first ultrasonic sensor 31 after being transmitted by the second ultrasonic sensor 32. The second count value is a value detected in a period from the transmission to the reception of the second ultrasonic wave, and therefore, correlates with the propagation time of the second ultrasonic wave. That is, the second measured value is not limited to a count value but may be another parameter the propagation time of which is calculable.

(First Calculator 61)

The first calculator 61 calculates the propagation time of the first ultrasonic wave on the basis of the first count value detected by the first detector 531.

In addition, if the second detector 532 detects the second count value, the first calculator 61 calculates the propagation time of the second ultrasonic wave on the basis of the second count value (hereinafter also referred to as the second count value of this time) detected by the second detector 532.

On the other hand, if the second detector 532 does not detect the second count value, the first calculator 61 calculates the propagation time of the second ultrasonic wave on the basis of the second count value (hereinafter also referred to as the second count value of the past) in the memory 54 associated with the first count value of the past used for decision by the determiner 52. The second count value of the past is one example of information correlated with a flow rate of the past.

(Second Calculator 62)

The second calculator 62 calculates a fluid flow rate on the basis of the difference between the propagation time of the first ultrasonic wave calculated by the first calculator 61 and the propagation time of the second ultrasonic wave.

Specifically, if the second detector 532 detects the second count value of this time, the second calculator 62 calculates a fluid flow rate on the basis of the difference between the propagation time of the first ultrasonic wave and the propagation time of the second ultrasonic wave based on the second count value of this time. More specifically, the second calculator 62 calculates a fluid flow velocity on the basis of the difference between the propagation time of the first ultrasonic wave and the propagation time of the second ultrasonic wave based on the second count value of this time. Then, the second calculator 62 calculates a flow rate on the basis of the calculated flow velocity and the cross-sectional area S of the flow path 4 (see FIG. 1).

On the other hand, if measurement based on the second ultrasonic wave is not performed, the second calculator 62 calculates a fluid flow rate on the basis of the difference between the propagation time of the first ultrasonic wave and the propagation time of the second ultrasonic wave based on the second count value of the past. That is, the second calculator 62 calculates a fluid flow rate on the basis of the second count value of the past which is information correlated with the flow rate of the past.

According to the flow rate-measuring system 1 of the present embodiment, measurement based on the second ultrasonic wave can be skipped if the difference between the first count value of this time and the first count value of the past is no larger than a threshold value. Consequently, it is possible to reduce power consumption required for the detection of the second count value.

(Method of Flow Rate Measurement)

Figure 2:
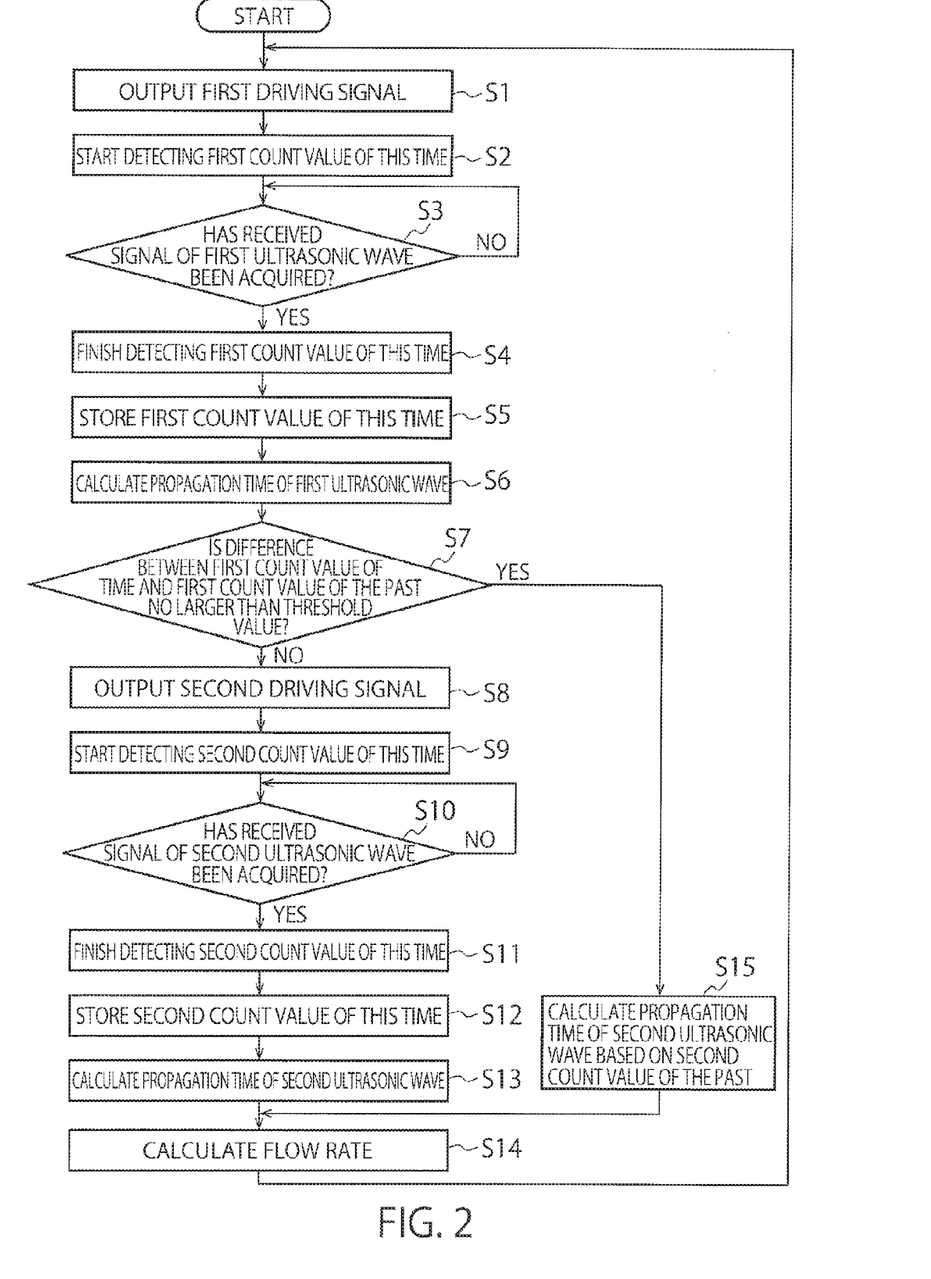
FIG. 2 is a flowchart of a method of flow rate measurement illustrating the present embodiment.

Next, a description will be made of a method of flow rate measurement to which the flow rate-measuring system 1 of FIG. 1 is applied. FIG. 2 is a flowchart of the method of flow rate measurement illustrating the present embodiment.

First, the controller 51 outputs a first driving signal to the first ultrasonic sensor 31 and the counter 53 through the transceiver 56 (step S1). The output of the first driving signal causes measurement based on a first ultrasonic wave of this time to start.

When the first driving signal is output, the first detector 531 of the counter 53 starts detecting the first count value of this time, i.e., counting up clock pulses (step S2).

Subsequently, the first detector 531 determines whether or not a received signal of the first ultrasonic wave has been acquired from the second ultrasonic sensor 32 (step S3).

Then, if the received signal of the first ultrasonic wave has been acquired (Yes in step S3), the first detector 531 finishes detecting the first count value of this time (step S4). In this case, a count value at the end of detection equals the first count value of this time. End of the detection of the first count value of this time causes measurement based on the first ultrasonic wave of this time to end.

On the other hand, if the received signal of the first ultrasonic wave has not been acquired (No in step S3), the first detector 531 continues to detect the first count value of this time and repeats determination (step S3).

Subsequently, the controller 51 causes the first count value of this time to be stored in the memory 54 (step S5).

Subsequently, the first calculator 61 calculates the propagation time of the first ultrasonic wave on the basis of the first count value of this time acquired from the first detector 531 (step S6). For example, the first calculator 61 may calculate the propagation time of the first ultrasonic wave by comparing the first count value of this time with a previously acquired clock pulse count value for a given length of time. The first detector 531 may detect the clock pulse count value for a given length of time before the start of detection of the first count value (step S2). The semiconductor device 6 may input clock pulses for a given length of time to the counter 53.

Subsequently, the comparator 55 compares the first count value of this time with the first count value of the last time stored in the memory 54.

Specifically, the determiner 52 determines whether the difference between the first count value of this time and the first count value of the past is no larger than a threshold value (step S7). This determination is also determination as to whether or not a second count value of this time is detected.

Note that step S6 and step S7 may be carried out concurrently with each other.

Then, if the difference between the first count value of this time and the first count value of the past is larger than a threshold value (No in step S7), i.e., if a decision is made to perform measurement based on the second ultrasonic wave of this time, the controller 51 outputs the second driving signal to the second ultrasonic sensor 32 and the counter 53 through the transceiver 56 (step S8). The output of the second driving signal causes measurement based on the second ultrasonic wave of this time to start.

When the second driving signal is output, the second detector 532 of the counter 53 starts detecting the second count value of this time (step S9).

Subsequently, the second detector 532 determines whether or not a received signal of the second ultrasonic wave has been acquired from the first ultrasonic sensor 31 (step S10).

Then, if the received signal of the second ultrasonic wave has been acquired (Yes in step S10), the second detector 532 finishes detecting the second count value of this time (step S11). In this case, a count value at the end of detection equals the second count value of this time. End of the detection of the second count value of this time causes measurement based on the second ultrasonic wave of this time to end.

On the other hand, if the received signal of the second ultrasonic wave has not been acquired (No in step S10), the counter 53 continues to detect the second count value of this time and repeats determination (step S10).

Subsequently, the controller 51 causes the second count value of this time to be associated with the first count value of this time, and to be stored in the memory 54 (step S12).

Subsequently, the first calculator 61 calculates the propagation time of the second ultrasonic wave on the basis of the second count value of this time (step S13). For example, the first calculator 61 may calculate the propagation time of the second ultrasonic wave by comparing the second count value of this time with the clock pulse count value for a given length of time used to calculate the propagation time of the first ultrasonic wave.

Subsequently, the second calculator 62 calculates a fluid flow rate on the basis of the difference between the propagation time of the first ultrasonic wave and the propagation time of the second ultrasonic wave (step S14).

In the calculation of the flow rate (step S14), the second calculator 62 first calculates a fluid flow velocity according to Mathematical Expression (1) shown below:

$$V=(L/2 \cos \theta) \times (1/t1 - 1/t2) \quad (1)$$

Note that in Mathematical Expression (1), "V" is a fluid flow velocity, "L" is the propagation length of an ultrasonic wave (see FIG. 1), "θ" is an angle formed by the propagation direction D2 of the ultrasonic wave and the flow direction D1 (see FIG. 1), "t1" is the propagation time of the first ultrasonic wave, and "t2" is the propagation time of the second ultrasonic wave.

Mathematical Expression (1) can be derived from Mathematical Expression (2) shown below to represent t1 which is the propagation time of the first ultrasonic wave and Mathematical Expression (3) shown below to represent t2 which is the propagation time of the second ultrasonic wave.

$$t1=L/(C+V \cos \theta) \quad (2)$$

$$t2=L/(C-V \cos \theta) \quad (3)$$

Note that in Mathematical Expressions (2) and (3), "C" is the velocity of an ultrasonic wave in a fluid, i.e., an acoustic velocity. Mathematical Expression (1) can be derived by deleting "C" from Mathematical Expressions (2) and (3).

Subsequently, the second calculator 62 calculates a fluid flow rate according to Mathematical Expression (4) shown below:

$$Q=S \times V \quad (4)$$

Note that in Mathematical Expression (4), "Q" is a fluid flow rate, and "S" is the cross-sectional area of the flow path 4.

If the flow velocity "V" is evaluated directly from Mathematical Expression (2) or Mathematical Expression (3) using the velocity "C" of an ultrasonic wave in a fluid, such a flow velocity "V" is affected by a change in the velocity "C" of an ultrasonic wave due to temperature and pressure and is, therefore, not an exact value. In contrast, in the present embodiment, an exact flow velocity "V" can be calculated using Mathematical Expression (1) not containing "C", without being affected by a change in the velocity "C" of an ultrasonic wave. As a result, it is possible to measure an exact flow rate "Q".

On the other hand, if the difference between the first count value of this time and the first count value of the last time is no larger than a threshold value (Yes in step S7), i.e., if a decision is made not to perform measurement based on the second ultrasonic wave of this time, the second calculator 62 calculates the propagation time of the second ultrasonic wave on the basis of the second count value of the past stored in the memory 54 (step S15). Thereafter, the second calculator 62 moves to a step of calculating a flow rate on the basis of the propagation time of the first ultrasonic wave and the propagation time of the second ultrasonic wave (step S14).

After the calculation of a flow rate (step S14), the second calculator 62 repeats the above-described series of processes, in order to calculate a flow rate of the next time (steps S1 to S15).

According to the method of flow rate measurement of the present embodiment, measurement based on the second ultrasonic wave, i.e., the calculation of the second count value of this time can be skipped if the difference between the first count value of this time and the first count value of the past is no larger than a threshold value. Consequently, it is possible to reduce power consumption required for the calculation of the second count value. Since power consumption can be reduced, it is possible to measure dynamically-changing fluid flow rates at low costs.

In addition, according to the method of flow rate measurement of the present embodiment, a flow rate can be calculated with a high degree of correctness by substituting the propagation time t2 of the second ultrasonic wave based on the second count value of the last time into Mathematical Expression (1) and calculating the flow rate, if the second count value of this time is not detected.

Modified Examples

In addition to the above-described examples, various modified examples may be applied to the present embodiment.

For example, the second calculator 62 may calculate the velocity "C" of an ultrasonic wave according to Mathematical Expression (2), after calculating the flow velocity "V" according to Mathematical Expression (1), and store the calculated velocity "C" of an ultrasonic wave in the memory 54 while associating the velocity with the first count value. Note that the velocity "C" of an ultrasonic wave can be calculated on the basis of the flow velocity "V" the flow rate "Q" of which is calculable, and therefore, correlates with the flow rate "Q". Then, the stored velocity "C" of an ultrasonic wave may be used as information correlated with the flow rate of the past to calculate the latest flow rate. Specifically, if the second count value of this time is not detected, the second calculator 62 may calculate the flow velocity "V" by substituting the velocity "C" of the last time stored in the memory 54 and the propagation time "t1" of the first ultrasonic wave based on the first count value of this time into Mathematical Expression (2). Then, the second calculator 62 may substitute the calculated flow velocity "V" into Mathematical Expression (4) to calculate the flow rate "Q". Also in this case, it is possible to reduce power consumption required for the detection of the second count value, as in the above-described embodiment.

In addition, the second calculator 62 may store the flow velocity "V" in the memory 54 while associating the flow velocity with the first count value. Then, the second calculator 62 may use the flow velocity "V" of the last time stored in the memory 54 as information correlated with the flow rate of the past to calculate the latest flow rate, if the second count value of this time is not detected. In this case, it is possible to skip the calculation of the flow velocity "V".

Yet additionally, the flow rate-measuring device 2 may be capable of switching between flow rate measurement in a first mode in which the second count value of this time is not detected depending on the difference between the first count value of this time and the first count value of the last time and flow rate measurement in a second mode in which the second count value of this time is constantly detected.

Still additionally, the flow rate-measuring device 2 may apply acoustic waves in an audible range.

Still additionally, the present embodiment can be applied to flow velocity meters for measuring fluid flow velocities.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A semiconductor device used to measure the flow velocity or the flow rate of a fluid based on the difference between the propagation time of an acoustic wave to a downstream side of a fluid flow path and the propagation time of the acoustic wave to an upstream side of the fluid flow path, the semiconductor device comprising:
   a controller which controls an upstream-side first transceiver and a downstream-side second transceiver which transmit/receive an acoustic wave to/from each other in the flow path and controls a first measurement including a transmission of a first acoustic wave in one of the first and second transceivers and the reception of the first acoustic wave in the other one of the first and second transceivers and controls a second measurement including a transmission of a second acoustic wave in the other transceiver and the reception of the second acoustic wave in the one transceiver;
   a first detector which detects a first measured value correlated with a propagation time of the first acoustic wave in a first detection period from the transmission to the reception of the first acoustic wave in the first measurement;
   a second detector which detects a second measured value correlated with a propagation time of the second acoustic wave in a second detection period from the transmission to the reception of the second acoustic wave in the second measurement;
   a determiner which determines the presence or absence of the second measurement on the basis of a result of comparison between the first measured value and a previous first measured value measured earlier than the first measured value; and
   a first calculator which calculates the propagation time of the first acoustic wave on the basis of the first measured value, and calculates the propagation time of the second acoustic wave on the basis of the second measured value; and
   a second calculator which calculates the fluid flow velocity or the flow rate on the basis of a difference between the propagation time of the first acoustic wave and the propagation time of the second acoustic wave when the second measurement is performed, or calculates the flow velocity or the flow rate on the basis of information correlated with the flow velocity or the flow rate of the past when the second measurement is not performed.

2. The semiconductor device according to claim 1, wherein the determiner determines that the second measurement is not performed if a difference between the first measured value and the previous first measured value is no larger than a threshold value.

3. The semiconductor device according to claim 1, wherein the previous first measured value is a first measured value detected in a previous first detection period.

4. The semiconductor device according to claim 1, wherein the first detector detects a first count value given by counting clock pulses as the first measured value, and the second detector detects a second count value given by counting clock pulses as the second measured value.

5. The semiconductor device according to claim 1, wherein the controller causes the first measured value to be stored in a memory, and the first measured value stored in the memory is the previous first measured value.

6. The semiconductor device according to claim 1, further comprising a comparator which compares the first measured value and the previous first measured value.

7. A measurement device comprising:
   a controller which controls an upstream-side first transceiver and a downstream-side second transceiver which transmit/receive an acoustic wave to/from each other in the flow path of a fluid and controls a first measurement including a transmission of a first acoustic wave in one of the first and second transceivers and the reception of the first acoustic wave in the other one of the first and second transceivers and controls a second measurement including a transmission of a second acoustic wave in the other transceiver and the reception of the second acoustic wave in the one transceiver;
   a first detector which detects a first measured value correlated with a propagation time of the first acoustic wave in a first detection period from the transmission to the reception of the first acoustic wave in the first measurement;
a second detector which detects a second measured value correlated with a propagation time of the second acoustic wave in a second detection period from the transmission to the reception of the second acoustic wave in the second measurement;
a determiner which determines the presence or absence of the second measurement on the basis of a result of comparison between the first measured value and a previous first measured value measured earlier than the first measured value;
a first calculator which calculates the propagation time of the first acoustic wave on the basis of the first measured value, and calculates the propagation time of the second acoustic wave on the basis of the second measured value; and
a second calculator which calculates the fluid flow velocity or the flow rate on the basis of the difference between the propagation time of the first acoustic wave and the propagation time of the second acoustic wave when the second measurement is performed, or calculates the flow velocity or the flow rate on the basis of information correlated with the flow velocity or the flow rate of the past when the second measurement is not performed.

8. The measurement device according to claim 7, wherein the determiner determines that the second measurement is not performed if a difference between the first measured value and the previous first measured value is no larger than a threshold value.

9. The measurement device according to claim 7, wherein the previous first measured value is a first measured value detected in a previous first detection period.

10. The measurement device according to claim 7, wherein the first detector detects a first count value given by counting clock pulses as the first measured value, and the second detector detects a second count value given by counting clock pulses as the second measured value.

11. The measurement device according to claim 7, wherein the controller causes the first measured value to be stored in a memory, and the first measured value stored in the memory is the previous measured value.

12. The measurement device according to claim 11, wherein the controller causes the second measured value to be stored in the memory while associating the second measured value with the first measured value detected immediately before the detection of the second measured value, the information correlated with the flow velocity or the flow rate of the past is the second measured value stored in the memory, the first calculator calculates the propagation time of the second acoustic wave on the basis of the second measured value in the memory associated with the first measured value of the past, when the second measurement is not performed, and the second calculator calculates the flow velocity or the flow rate on the basis of the difference between the propagation time of the first acoustic wave and the propagation time of the second acoustic wave calculated based on the second measured value in the memory, when the second measurement is not performed.

13. The measurement device according to claim 11, wherein the controller further causes the previous first measured value to be stored in the memory.

14. The measurement device according to claim 7, comprising a comparator which compares the first measured value and the previous first measured value.

15. A measurement method comprising:
performing a first measurement including a transmission of a first acoustic wave in one of an upstream-side first position and a downstream-side second position and a reception of the first acoustic wave in the other one of the first and second positions in a flow path of a fluid to detect a first measured value correlated with a propagation time of the first acoustic wave in a first detection period from the transmission to the reception of the first acoustic wave in the first measurement;
calculating the propagation time of the first acoustic wave on the basis of the first measured value;
determining the presence or absence of a second measurement including a transmission of the second acoustic wave in the other position and a reception of the second acoustic wave in the one position on the basis of a result of comparison between the first measured value and a previous first measured value measured earlier than the first measured value;
detecting a second measured value correlated with a propagation time of the second acoustic wave in a second detection period from the transmission to the reception of the second acoustic wave when a decision is made to perform the second measurement;
calculating the propagation time of the second acoustic wave on the basis of the second measured value when the second measurement is performed; and
calculating the flow velocity or the flow rate of the fluid on the basis of the difference between the propagation time of the first acoustic wave and the propagation time of the second acoustic wave when the second measurement is performed, or calculating the flow velocity or the flow rate on the basis of information correlated with flow velocity or flow rate of the past when the second measurement is not performed.

16. The measurement method according to claim 15, wherein a decision is made not to perform the second measurement if a difference between the first measured value and the previous first measured value is no larger than a threshold value.

17. The measurement method according to claim 15, wherein the previous first measured value is a first measured value detected in a previous first detection period.

18. The measurement method according to claim 15, comprising:
detecting a first count value given by counting clock pulses as the first measured value, and;
detecting a second count value given by counting clock pulses as the second measured value.

19. The measurement method according to claim 15, comprising:
causing the first measured value to be stored in a memory;
causing the second measured value to be stored in the memory while associating the second measured value with the first measured value detected immediately before the detection of the second measured value, the first measured value of the past being the first measured value stored in the memory and the information correlated with the flow velocity or the flow rate of the past being the second measured value stored in the memory; and
calculating the propagation time of the second acoustic wave on the basis of the second measured value in the memory associated with the first measured value of the past, and calculating the flow velocity or the flow rate on the basis of the difference between the propagation time of the first acoustic wave and the propagation time of the second acoustic waver when the second measurement is not performed.

\* \* \* \* \*